Nov. 15, 1949  J. A. MORRONE  2,488,426
ANTISKID DEVICE FOR VEHICLE TIRES
Original Filed Feb. 28, 1947

Inventor:-
Joseph A. Morrone
by
Attorneys

Patented Nov. 15, 1949

2,488,426

UNITED STATES PATENT OFFICE 2,488,426

ANTISKID DEVICE FOR VEHICLE TIRES

Joseph A. Morrone, Westerly, R. I., assignor to Morrone Manufacturing Co., Westerly, R. I., a corporation of Rhode Island Original application February 28, 1947, Serial No. 731,531. Divided and this application October 23, 1947, Serial No. 781,685

2 Claims. (Cl. 152—225)

The object of my invention is to provide a novel, effective and inexpensive anti-skid device for vehicle tires, which device may be readily attached directly to and detached from the tire, thereby eliminating the necessity of providing additional elements for securing the anti-skid device in position.

My invention comprises an anti-skid device for removable attachment directly to a vehicle tire in any desired position around the tire, said anti-skid device comprising an intermediate elastic portion stretchable across the tread of the tire and provided with means for engaging the tire on opposite sides of its tread.

My invention comprises more particularly an anti-skid device adapted to be secured directly to a vehicle tire which device comprises an intermediate portion of solid material such as elastic rubber which may be stretched across the tire tread, said intermediate portion being provided at its ends with means such as inclined end portions having inwardly turned ends for biting into the tire upon opposite sides of its tread.

Figure 1:
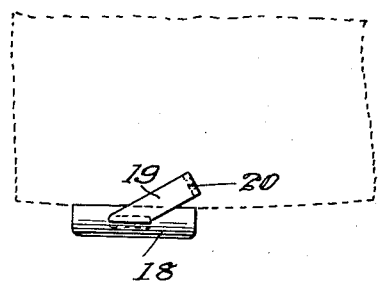
Figure 2:
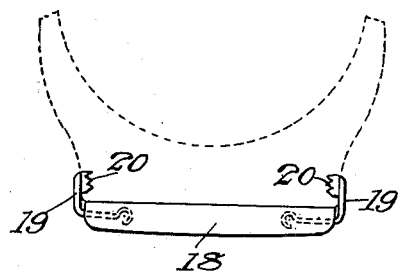

A practical embodiment of my invention is represented in the accompanying drawings, in which Fig. 1 represents an end view of the anti-skid device when attached to a pneumatic tire, a portion of the tire being shown in dotted lines, which device comprises an intermediate portion of elastic material, as rubber, provided at its ends with resilient means for removably engaging the tire; and Fig. 2 represents a side view of the same.

The anti-skid device which is adapted to be secured directly to the vehicle tire is shown as comprising an intermediate portion 18 of elastic solid material, as rubber, which is stretchable across the tire tread, said intermediate portion having means, as inclined resilient end portions 19 permanently united to the intermediate portion and provided with inwardly turned toothed ends 20 for biting into the tire on opposite sides of its tread.

It will be noted that these ends 20 are turned inwardly substantially in the plane of the inclined end portions 19, so that the ends will be at an angle to the circumference of the tire, thereby reducing the tendency of the anti-skid device to creep along the tire and thus cause the ends 23 to cut the tire.

In actual practice, as many anti-skid devices may be attached to the tire as may be desired. It will be seen from the above description that the anti-skid device may be readily attached to and removed from the tire. It will also be observed that no additional elements are required to attach the anti-skid device to the tire.

This application is a division of my co-pending application filed February 28, 1947, now Patent No. 2,441,670 issued May 18, 1948.

It is evident that various changes may be resorted to in the construction, form and arrangement of the several parts without departing from the spirit and scope of my invention, and hence I do not intend to be limited to the particular embodiment herein shown and described, but what I claim is:

1. An anti-skid device adapted to be secured directly to a vehicle tire and comprising an intermediate portion of elastic solid material stretchable across the tire tread and separate resilient end portions permanently united to said intermediate portion and having inwardly turned ends for biting into the tire on opposite sides of its tread.

2. An anti-skid device adapted to be secured directly to a vehicle tire and comprising an intermediate portion of elastic solid material stretchable across the tire tread and separate inclined resilient end portions permanently united to said intermediate portion and having inwardly turned toothed ends for biting into the tire on opposite sides of its tread.

JOSEPH A. MORRONE.

REFERENCES CITED

The following references are of record in the file of this patent:

UNITED STATES PATENTS

| Number | Name | Date |
|---|---|---|
| 2,330,839 | O'Brien | Oct. 5, 1943 |
| 2,441,670 | Morrone | May 18, 1948 |